United States Patent Office 3,213,159
Patented Oct. 19, 1965

3,213,159
METHOD OF BLENDING POLYSTYRENE AND GRAFT COPOLYMER OF STYRENE WITH BUTADIENE POLYMER
Domas Adomaitis, Chicago, Ill., assignor to Standard Oil Company, Chicago, Ill., a corporation of Indiana
No Drawing. Filed Apr. 26, 1962, Ser. No. 190,211
4 Claims. (Cl. 260—876)

This invention relates to the preparation of polystyrene molding compositions. More particularly, it concerns a process for preparing such compositions to afford homogeneous blends of polymeric styrene and rubbery polymers having improved impact properties and which are easy to mold and/or extrude to smooth, glossy uniform articles. The invention is especially concerned with processes for the preparation of useful high impact polystyrene compositions by compounding certain rubbery graft copolymers with hydrocarbon solutions of polystyrene, and to the compositions prepared thereby.

It has hitherto been known to prepare ternary compositions comprising mixtures of (1) styrene-type resins, (2) graft copolymers of styrene on a rubbery butadiene polymer or copolymer backbone, and (3) rubbery butadiene polymers or copolymers, as for example in U.S. Patent 2,755,270 of Robert A. Hayes. Such compositions, especially those containing from 80–95% of polystyrene based on the weight of polymeric ingredients in the resinous composition are particularly useful for injection molding applications in that they combine the excellent strength and hardness of polystyrene with a high degree of resistance to impact.

It has now been found that thermoplastic compositions having good molding characteristics and high impact strength can readily be prepared from polystyrene and a graft polymer of styrene on a rubbery butadiene polymer or copolymer by employing a graft copolymer of the aforesaid type which has been prepared in a particular way. The process of the present invention, and the binary compositions produced thereby, are much simpler to prepare than those of the prior art which require the presence of three separate and distinct polymeric components in the final resin composition.

The first step in the preparation of the plastic compositions of this invention is to provide an aqueous emulsion of polymerized butadiene or of a rubbery copolymer of butadiene and styrene containing at least 50% butadiene in the molecule. The next step in the preparation of the composition is to polymerize styrene monomer in the presence of the aforesaid butadiene resin. This step is essentially a graft polymerization, in which styrene becomes chemically combined as side chains on the polybutadiene base or "backbone" polymer. An essential feature of the present invention is the step of first pre-coagulating the polybutadiene or rubbery copolymer of polybutadiene, and subsequently effecting the graft polymerization of styrene on the precoagulum. Finally, the graft copolymer, prepared by reaction of styrene with pre-coagulated rubbery butadiene polymer, is dispersed in a hydrocarbon solution of polystyrene to effect homogeneous distribution of the graft polymer in polystyrene, and the resultant solution treated for recovery of the binary graft copolymer-polystyrene composition.

The rubbery polymer employed to prepare the compositions described herein comprises a conventional "hot" or "cold" rubbery homopolymer of butadiene or a copolymer of butadiene and styrene containing at least 50% butadiene together with up to 50% styrene. It has been found that the proportion of styrene in the copolymer is critically maintained below 50 weight percent, preferably from about 10 to about 30 weight percent, higher styrene contents leading to greatly reduced impact strength of the final composition. Such homopolymers or copolymers of butadiene and styrene are commercially available, or may be prepared by polymerization in emulsion in a manner known to the art, employing peroxide catalysts or "redox" catalyst systems.

The graft copolymer component of the compositions produced by the process of the present invention is prepared by effecting free radical polymerization of styrene in the presence of a previously prepared pre-coagulated latex of butadiene homopolymer or copolymer with styrene. The amount of styrene which is grafted upon the butadiene containing backbone can be varied from about 10 to about 80% by weight based upon the weight of graft copolymer, desirably 30–50%. In general, polymerization techniques known to the art, employing free radical generating catalysts can be employed, together with such known polymerization ingredients as emulsifying agents, chain transfer agents and the like for effecting complete and rapid graft polymerization of the monomeric styrene. In the graft polymerization reaction, it appears that a substantial portion of the polystyrene becomes attached to the backbone chain, and that a relatively minor amount of free polystyrene is formed.

As previously discussed, the graft polymerization of styrene is effected in the presence of the pre-coagulated polybutadiene or rubbery copolymer of butadiene and styrene. The latex of the butadiene homopolymer or copolymer, which comprises a finely divided emulsion of polymer, is pre-coagulated by the addition of mineral acids, such as sulfuric acid, hydrochloric acid, etc., or by the addition of salts which have a coagulating effect on the latex, e.g., aqueous solutions of sodium chloride, calcium chloride and the like.

In grafting styrene onto the rubbery polymer of butadiene, the pre-coagulated latex is charged to a polymerization reactor. Mechanical mixing may be employed for this purpose, and it is obvious that while the pre-coagulum will be distributed into smaller particles, it does not revert to the extremely finely divided, emulsified form, in which it is originally prepared. Styrene to be used in the graft polymerization step may be added to the reactor containing the pre-coagulate just prior to polymerization or it may be contacted with the pre-coagulate for a period of time prior to polymerization to permit swelling of the pre-coagulate with the monomer and thus more intimate contact of the monomer with all parts of the pre-coagulated rubber.

Graft polymerization is effected at temperatures between 0° and about 100° C., preferably 20° C. to 80° C., in the presence of well-known peroxide catalysts, and under autogeneous pressure.

The graft polymer prepared as described above is then separated from the watery phase and homogeneously dispersed in a hydrocarbon solution of polystyrene, in which case water accompanying the coagulum can be separated by azeotropic distillation. The separation of graft copolymer may be accomplished by addition of coagulating agents of the type described for coagulation of the polybutadiene latex, and the coagulum washed free of adherent catalyst and salts. Polystyrene ordinarily useful for molding or for incorporation into molding compositions can be used as one component of the compositions produced by our process. Such polystyrene resins may be obtained by bulk or emulsion polymerization of styrene using peroxidic or other known catalysts. Since the present process requires the use of a hydrocarbon solution of polystyrene, it is preferred to employ a resin solution prepared by polymerization of styrene in an aromatic solvent, for example hydrocarbon solutions of polystyrene which are obtained in accordance with the processes described in U.S. Patents 2,813,089 and 2,920,065. It is to be understood, however, that solutions of polystyrene obtained by dissolving polystyrene, prepared in accordance with methods well known to the art, in an aromatic hydrocarbon solvent are equally applicable to the present process.

Preferred polystyrene resins have an intrinsic viscosity (measured in benzene at 30° C.) of from about 0.8 to about 1.5 dl./g. and are characterized by impact strength in the range of from about 0.25 to 0.40 ft. lbs./in. notch (ASTM D256–56). The polystyrene solution comprises from about 10 to about 50% by weight polystyrene, preferably 15–25% polystyrene dissolved in an aromatic hydrocarbon such as benzene, toluene, ethylbenzene, xylenes, and the like. The particular solvent employed is not critical. The graft copolymer is added in an amonut which will provide, upon removal of water and solvents, a composition comprising from 5 to 30 parts, preferably 15 to 20 parts graft polymer per 100 parts of resin.

Addition of the graft polymer to the polystyrene solution yields a suspension which may contain some dissolved polymer. This suspension of graft polymer is preferably homogenized to obtain a more uniform distribution of the added resin, and to disperse large particles of gel by passage through a homogenizer at a pressure between about 500 and 5000 p.s.i.g., preferably below 3000 p.s.i. Any type of homogenizing equipment may be employed for this purpose. Prior to, or after homogenization, other materials including internal lubricants such as mineral oil, butylstearate and the like, color stabilizers, antioxidants, etc., in desired amounts may be blended with the polystyrene solution.

The homogenized polystyrene solution is then treated for removal of solvent and any residual water. For this purpose, the solution can be passed through a continuous vacuum extruder at a temperature between about 100° C. and about 250° C. wherein the solvent is removed under vacuum and the polystyrene composition recovered as an extrudate of uniform composition essentially free of volatile material.

PREPARATION OF RUBBER LATEX

Polybutadiene latex was prepared using the following conventional recipe for "redox" polymerization systems, in which the amount of all ingredients employed is based on 100 parts by weight of rubber expected.

| | |
|---|---|
| Butadiene | 100.0 |
| Cumene hydroperoxide | 0.75 |
| Sodium oleate | 3.0 |
| Tetrasodium pyrophosphate (.10 $H_2O$) | 0.5 |
| Sodium hydroxide | 0.15 |
| Dextrose, anhydrous | 1.0 |
| Ferrous sulfate heptahydrate | 0.0125 |
| Versene Fe–3 | 0.1 |
| Water | 200.0 |

The polymerization was carried out in a reactor provided with heating and cooling means and with a stirrer. All components other than the butadiene were charged, stirred to effect solution, and the butadiene then added. The reactor vent was closed, the contents heated to 50° C. and the mixture stirred and heated between 50° C. and 65° C. for about 5 hours. Traces of unreacted butadiene were then vented. The latex remaining in the reactor contained about 30% of polybutadiene.

Example 1

A portion of the polybutadiene latex prepared as above was pre-coagulated by addition with stirring of 2% sodium oleate (based on weight of rubber), and sufficient 10% sodium chloride solution to convert the latex to a creamy and pasty mixture. The pre-coagulated latex was permitted to age overnight.

The pre-coagulate thus obtained was charged to a polymerization reactor. The grafting of styrene onto the polybutadiene was effected by employing the same porportions of ingredients used in the formula above, the monomeric butadiene being substituted by polybutadiene and styrene. Styrene in an amount equal to the weight of polybutadiene employed (dry basis) was added during a period of one hour while maintaining the reactor contents with stirring at 60° C. Reaction at 60° C. was effected over a period of about four hours to practical completion.

Upon completion of the polymerization, the reactor contents were cooled and 1% (based on weight of graft copolymer) of Ionol (butylated-hydroxy-toluene) antioxidant added to the prepared latex.

Example 2

A second portion of the polybutadiene latex prepared as hereinbefore described was employed for preparation of a graft polymer without prior pre-coagulation of the latex. In this example, polybutadiene latex containing 50 parts (dry basis) polybutadiene was charged together with 50 parts monomeric styrene and 1.0 part potassium persulfate as catalyst to a closeable polymerization reactor. The reactor was purged of air by means of nitrogen, the reactor sealed and the contents heated to 50° C. with stirring. Polymerization was effected at 50–58° C. over 4–6 hours to substantial completion.

Upon completion of the polymerization, the reactor contents were cooled and 1% (based on weight of graft copolymer) of Ionol antioxidant added to the prepared latex.

PREPARATION OF POLYSTYRENE COMPOSITIONS

The graft copolymer latex prepared in each of Examples 1 and 2 was worked up in identical manner. In each case, sufficient 10% aqueous sodium chloride solution was added to the latex to precipitate the graft copolymer. The copolymer was then filtered, washed with water to remove inorganic salts, and the wet crumb dispersed by mechanical stirring in a solution of polystyrene in xylene containing 25% by weight polystyrene (intrinsic visocsity of about 1.0 dl./g. measured in benzene 30° C.). The blends in each case contained 20 parts of graft polymer (dry basis) and 80 parts polystyrene. The blends were then homogenized by passing through a homogenizer at 3000 p.s.i.g. pressure. The homogenized dispersion in each case was then passed through a devolatilizing vacuum extruder for removal of water and xylene. The resultant resinous polystyrene was employed to prepare injection molded test specimens which had the following properties:

| | Example 1 | Example 2 |
|---|---|---|
| Impact strength: Izod ft.-lbs. S.l. notch of unaged sample [1] | 2.19 | 0.40 |
| Elongation, percent: At fail of annealed sample [2] | 32.4 | 7.0 |
| Hardness: Of unaged sample Rockwell "M" scale [3] | 42.4 | 46.4 |

[1] ASTM Test D256–56.
[2] ASTM Test D638–56T.
[3] ASTM Test D785–51.

It will be seen from the above data that substantial improvement in the physical properties of the polystyrene composition was achieved by preparation of the graft copolymer component from a precoagulated rubber backbone, as described in Example 1 of the specification.

Examples 3–10

The procedure of Examples 1 and 2 were repeated in order to compare the effect of agglomeration prior to graft copolymer formation on the properties of polystyrene compositions of varied composition, as follows.

Example 3: Example 1 repeated except that the graft copolymer was employed in an amount of 15% by weight of the final composition.

Example 4: Example 2 repeated except that the graft copolymer was employed in an amount of 15% by weight of the final composition.

Example 5: Example 1 repeated except that the graft copolymer was prepared from 70 parts polybutadiene and 30 parts monomeric styrene.

Example 6: Example 2 repeated except that the graft copolymer was prepared from 70 parts polybutadiene and 30 parts monomeric styrene.

Example 7: Example 1 repeated except that backbone elastomer was a butadiene-styrene copolymer containing 70 parts butadiene and 30 parts styrene and graft copolymer was prepared from 70 parts butadiene-styrene copolymer and 30 parts monomeric styrene.

Example 8: Example 2 repeated using polymer of Example 7.

Example 9: Example 1 repeated except that backbone elastomer was a butadiene-styrene copolymer containing 86 parts butadiene and 14 parts styrene and graft copolymer was prepared from 70 parts butadiene-styrene copolymer and 30 parts monomeric styrene.

Example 10: Example 2 repeated using polymer of Example 9.

In each of Examples 5 through 10, the final polystyrene composition comprised 20 parts graft copolymer and 80 parts polystyrene.

TABLE I

| Example | Composition of backbone | Graft polymer ratio backbone/sytrene | Blend ratio graft/polystyrene | Impact strength | Elongation | Hardness |
|---|---|---|---|---|---|---|
| 3 | Polybutadiene | 50/50 | 15/85 | 1.30 | 34.6 | 52.4 |
| 4 | do | 50/50 | 15/85 | 0.43 | 16.9 | 54.2 |
| 5 | do | 70/30 | 20/80 | 2.46 | 14.0 | 34.9 |
| 6 | do | 70/30 | 20/80 | 1.35 | 24.8 | 33.2 |
| 7 | 70 butadiene, 30 styrene | 70/30 | 20/80 | 2.02 | 22.8 | 37.7 |
| 8 | do | 70/30 | 20/80 | 1.33 | 23.0 | 38.6 |
| 9 | 86 butadiene, 14 styrene. | 70/30 | 20/80 | 2.60 | 35.8 | 33.2 |
| 10 | do | 70/30 | 20/80 | 2.09 | 27.9 | 37.3 |

It will be apparent from the data reported in Table I that significantly improved physical properties, especially increased impact resistance, was obtained in each instance by pre-coagulation of the backbone polymer prior to formation of graft polymer therefrom.

I claim:

1. A process for the preparation of polystyrene resin composition which process comprises the steps of polymerizing a monomer selected from the group consisting of butadiene and mixtures of butadiene and styrene containing at least 50% butadiene in water in the presence of a free radical polymerization catalyst, and an emulsifying agent to produce an aqueous emulsion of a butadiene polymer, precoagulating said emulsion by addition thereto of a coagulating agent, adding monomeric styrene to the pre-coagulated polymer, polymerizing styrene in contact with said pre-coagulated polymer to form a graft copolymer containing from about 10 to about 80 parts grafted styrene per 100 parts graft copolymer, separating said graft copolymer from the water phase, admixing said separated graft polymer with a solution of polystyrene in an inert hydrocarbon solvent to form a resin composition containing from about 5 to about 30 parts of said graft copolymer per 100 parts of resin and separating from said solvent the resin composition so prepared.

2. The process of claim 1 wherein butadiene polymer contains from about 10 to about 30 weight percent styrene.

3. The process of claim 1 wherein the graft copolymer contains from about 30 to about 50 parts grafted styrene per 100 parts graft copolymer.

4. The process of claim 1 wherein sufficient coagulating agent is added to convert said emulsion to a creamy, pasty mixture.

References Cited by the Examiner
UNITED STATES PATENTS
3,041,310  6/62  Luftglass et al. _____ 260—876
3,062,777  11/62  Allen et al. _____ 260—876

MURRAY TILLMAN, Primary Examiner.
LEON J. BERCOVITZ, Examiner.